United States Patent [19]

Iwasa et al.

[11] Patent Number: 5,165,302
[45] Date of Patent: Nov. 24, 1992

[54] STEERING APPARATUS WITH FIXED PAD

[75] Inventors: Hiroki Iwasa; Chikao Nagasaka; Masuyuki Ueda; Shigeru Kato; Hisashi Aoki; Makoto Shibahara; Satoshi Mori; Junichi Nakaho, all of Aichi, Japan

[73] Assignee: Kabushiki Kaisha Tokai-Rika-Denki-Seisakusho, Japan

[21] Appl. No.: 810,533

[22] Filed: Dec. 19, 1991

Related U.S. Application Data

[63] Continuation of Ser. No. 442,602, Nov. 29, 1989, abandoned.

Foreign Application Priority Data

Dec. 2, 1988 [JP] Japan .................. 63-157542

[51] Int. Cl.$^5$ .................. B62D 1/04; B21D 53/26
[52] U.S. Cl. .................. 74/552; 29/894.1
[58] Field of Search ............... 74/484 R, 492, 552; 280/731, 743, 750; 29/894.1

[56] References Cited

U.S. PATENT DOCUMENTS

| | | | |
|---|---|---|---|
| 4,674,352 | 6/1987 | Mizuno et al. | 74/484 R |
| 4,742,727 | 5/1988 | Mizuno et al. | 74/484 R |
| 4,753,599 | 6/1988 | Kokubu et al. | |
| 4,768,394 | 9/1988 | Mizuno et al. | 74/484 R |
| 4,899,613 | 2/1990 | Kawaguchi | 280/731 X |

FOREIGN PATENT DOCUMENTS

| | | | |
|---|---|---|---|
| 0022679 | 1/1981 | European Pat. Off. | 74/552 |
| 1159287 | 12/1963 | Fed. Rep. of Germany | 74/552 |
| 1175092 | 7/1964 | Fed. Rep. of Germany | 74/552 |
| 1229860 | 6/1967 | Fed. Rep. of Germany | 74/552 |
| 2524632 | 12/1975 | Fed. Rep. of Germany | 74/552 |
| 2730672 | 1/1979 | Fed. Rep. of Germany | 74/552 |
| 2739938 | 3/1979 | Fed. Rep. of Germany | 74/552 |
| 3236257 | 4/1984 | Fed. Rep. of Germany | 74/552 |
| 60-58566 | 4/1985 | Japan | 74/552 |
| 60-111748 | 7/1985 | Japan | 74/552 |
| 0050271 | 3/1987 | Japan | 74/552 |
| 62-231849 | 10/1987 | Japan | 74/552 |
| 864240 | 3/1961 | United Kingdom | 74/552 |
| 1238645 | 7/1971 | United Kingdom | 74/552 |

Primary Examiner—Vinh T. Luong
Attorney, Agent, or Firm—Sixbey, Friedman, Leedom & Ferguson

[57] ABSTRACT

A steering apparatus with a fixed pad operated by a driver of a vehicle includes spokes one end of which extend in a tapered manner from a steering shaft and to the other end of which an annular steering operation portion is secured; and a fixed pad accommodated in a tapered space formed by the spokes, wherein an interval between opposing surfaces of the spokes and the fixed pad is set to be substantially uniform, so as to prevent a foreign object from being caught between the opposing surfaces when the steering operation portion is operated.

6 Claims, 7 Drawing Sheets

STEERING APPARATUS WITH FIXED PAD

This application is a continuation of application Ser. No. 07,442,602, filed Nov. 29, 1989 now abandoned.

BACKGROUND OF THE INVENTION

1. Field of the Invention

The present invention relates to a steering apparatus with a fixed pad wherein the fixed pad provided at the rotational center of a steering operation portion is held in a stationary state when the steering operating portion is operated.

2. Description of the Related Art

Among vehicles, there is a type of vehicle wherein a pad provided, with switches, a display and the like is disposed at the rotational center of a steering operation portion (steering wheel). In this arrangement, if the pad rotates integrally with the steering operation portion when the steering operation portion is operated, the operating efficiency of the switches would decline, and the image on the display would be inclined. Accordingly, a proposal has been made to provide a fixed pad which is adapted to rotate relative to the steering operation portion so as to be held in a stationary state at a predetermined position (Japanese Patent Application Laid-Open No. 231849/1987).

Hence, the fixed pad functions as a fixed operation panel, and the operating efficiency of the switches operated by the occupant is improved.

However, the steering operation portion is fixed to a steering shaft via a wheel stay, and the wheel stay is constituted by a plurality of spokes to improve the visibility of an instrument panel. As a result, when the steering operation portion is operated, there are cases where the rear side of the fixed pad (located more closely to the occupant than the spokes) corresponds with the spoke and where it does not, so that it is conceivable that a foreign object may be caught between them. Hence, in a case where a force exceeding a predetermined level is exerted on the fixed pad, the fixed pad is rotatively operated in the same direction as the rotating direction of the steering operation portion, thereby overcoming the aforementioned drawback (refer to Japanese Utility Model Laid-Open Nos. 58566/1985 and 111748/1985).

With this arrangement, however, since electrical parts such as switches are provided on the fixed pad, it is necessary to provide a structure which will be able to maintain a state of wiring with respect to the chassis side even when the fixed pad is rotated. This results in an increased number of parts used, and since the apparatus becomes complicated, the assembling efficiency declines.

Therefore, an arrangement has been conceived in which an outer periphery of the fixed pad is covered with a guide member which rotates integrally with the steering operation portion, and a boundary portion of relative rotation is set on the side of the apparatus facing the occupant. With this structure, however, the size of the fixed pad is restricted, and especially in a vehicle provided with an air bag mechanism there is a drawback in that the bag, which is inflated at the time of a sudden deceleration of the vehicle and is interposed between the steering apparatus and the occupant, cannot be accommodated in the fixed bag.

SUMMARY OF THE INVENTION

Accordingly, an object of the present invention is to provide a steering apparatus with a fixed pad which allows a steering operation to be effected smoothly by effectively preventing a foreign object from being caught therein without restricting the configuration of the fixed pad, thereby overcoming the above-described drawbacks of the conventional art.

To this end, in accordance with one aspect of the invention, there is provided a steering apparatus with a pad for a vehicle, comprising: a steering shaft for transmitting a steering force by axial rotation thereof; a wheel stay secured to one end of the steering shaft and extending therefrom in a tapered manner by being gradually spaced apart from an axis of the steering shaft; a steering operation portion secured to a distal end of the wheel stay; and a fixed pad which is accommodated in a tapered space formed by the wheel stay and is rotated relative to the steering operation portion and the wheel stay when the steering operation portion is operated, wherein an interval between at least an entire outer peripheral portion of the fixed pad and the wheel stay is set to be substantially uniform.

In accordance with another aspect of the invention, there is provided a steering apparatus with a fixed pad for a vehicle, comprising: a steering shaft for transmitting a steering force by axial rotation thereof; a spoke secured to one end of the steering shaft and extending therefrom in a tapered manner by being gradually spaced apart from an axis of the steering shaft; a steering operation portion secured to a distal end of the spoke; and a fixed pad which is accommodated in a tapered space formed by the spoke and is rotated relative to the steering operation portion and the spoke when the steering operation portion is operated, wherein an angle of intersection between an outer peripheral edge of the fixed pad and an outer peripheral edge of the spoke is set in such a manner as to form an obtuse angle regardless of whether or not the steering operation portion is operated.

In accordance with still another aspect of the invention, there is provided a steering apparatus with a fixed pad for a vehicle, comprising: a steering shaft for transmitting a steering force by axial rotation thereof; a spoke secured to one end of the steering shaft and extending therefrom in a tapered manner by being gradually spaced apart from an axis of the steering shaft; a steering operation portion secured to a distal end of the spoke; and a fixed pad which is accommodated in a tapered space formed by the spoke and is rotated relative to the steering operation portion and the spoke when the steering operation portion is operated, wherein an interval between at least an entire outer peripheral portion of the fixed pad and the wheel stay is set to be substantially uniform, and an angle of intersection between an outer peripheral edge of the fixed pad and an outer peripheral edge of the spoke is set in such a manner as to form an obtuse angle regardless of whether or not the steering operation portion is operated.

In accordance with the present invention, since the steering operation can be effected while constantly maintaining a uniform interval between an outer periphery of the fixed pad and a surface of the wheel stay opposing thereto without any irregular surface, it is possible to effect a steering operation smoothly by effectively preventing a foreign object from being caught therein without restricting the configuration of the fixed pad. In addition, since the wheel stay is arranged in a tapered manner and a large tapered space is provided, it is possible to further increase the size of the fixed pad. Accordingly, numerous parts including a bag for an air bag mechanism, operation switches, displays, etc. can be disposed in that space.

When the wheel stay and the fixed pad are rotated relative to each other, there are cases where the outer peripheral edge of the spoke and the fixed pad intersect each other depending on their configurations. At that time, if an angle of intersection is always formed into an obtuse angle, even if a foreign object is placed at this point of intersection, the foreign object is pushed out as the steering operation portion is rotated, so that the foreign object is not caught thereat.

A description will be given hereinunder of a basic principle for obtaining the obtuse angle of intersection mentioned above.

Figure 7:
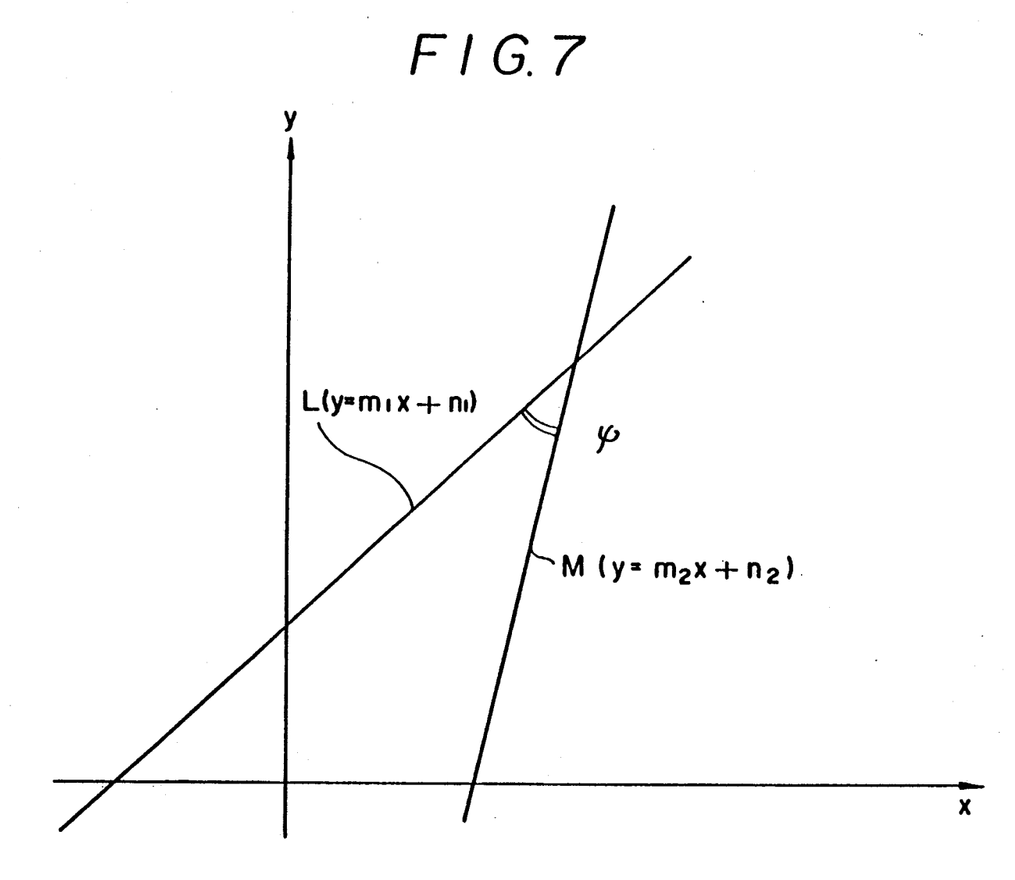
FIG. 7 is a diagram illustrating a basic principle for obtaining an angle of intersection between two straight lines.

As shown in FIG. 7, in a case where an angle of intersection, $\phi$, is determined when two straight lines L, M on X-Y coordinates intersect each other, if it is assumed that an equation of the straight line L is $y = m_1 x + n_1$, while an equation of the straight line M is $y = m_2 x + n_2$, the angle of intersection, $\phi$, can be obtained from the following formula:

$$\tan\phi = \frac{m_2 - m_1}{1 + m_1 m_2}$$

Here, as for a condition for the angle of intersection, $\phi$, to be an obtuse angle, it suffices if $\tan\phi$ becomes minus. Accordingly, the angle of intersection, $\phi$, becomes an obtuse angle if either of the following formulae is met:

$m_2 - m_1 < 0$ and $1 + m_1 \times m_2 > 0$ and $m_2 - m_1 < 0$ and $1 + m_1 \times m_2 > 0$.

Thus, the angle of intersection, $\phi$, between the two straight lines L, M can be obtained on the basis of the above-described basic principle. In the present invention, since the outer peripheral edges of the wheel stay and the fixed pad are not necessarily straight, in such a case it suffices if tangents at a point of intersection are determined and a setting is provided in such a manner as to satisfy the aforementioned conditions.

The above and other objects, features and advantages of the invention will become more apparent from the following detailed description of the invention when read in conjunction with the accompanying drawings.

DESCRIPTION OF THE PREFERRED EMBODIMENTS

Figure 1:
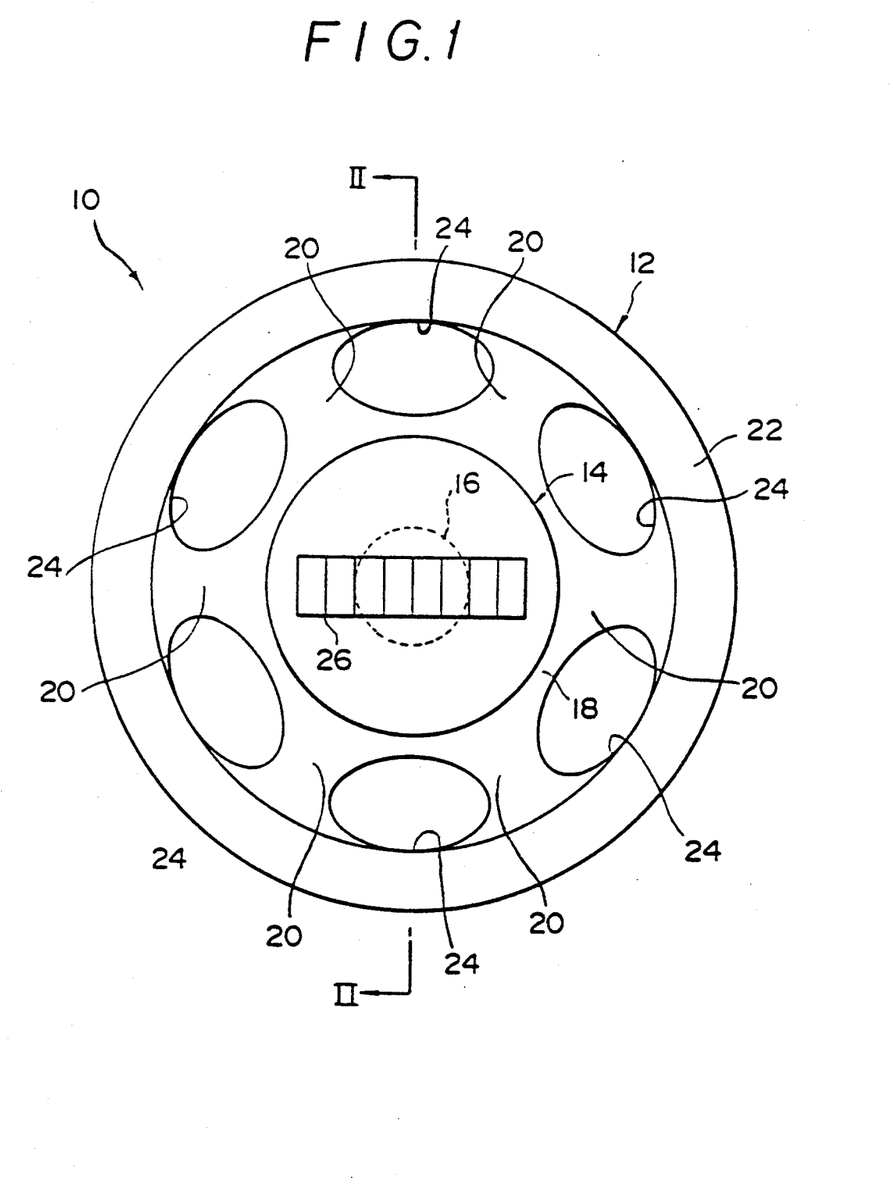
FIG. 1 is a front elevational view of a steering apparatus in accordance with a first aspect of the invention.
Figure 2:
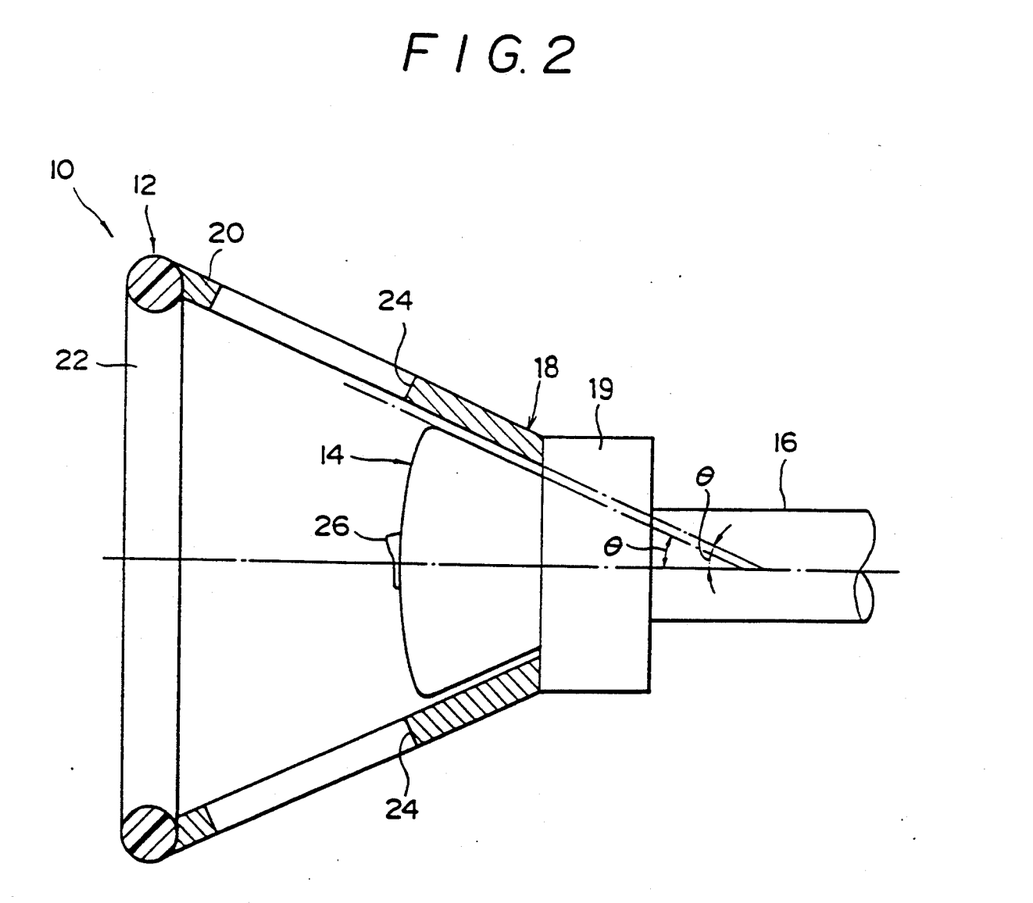
FIG. 2 a cross-sectional view taken along the line II—II of FIG. 1.

FIGS. 1 and 2 illustrate a steering apparatus 10 with a fixed pad in accordance with a first embodiment. The steering apparatus 10 with a pad comprises a steering body 12, a fixed pad 14, and a steering shaft 16. The steering shaft 16 has one end connected to an unillustrated steering gear, and the steering apparatus 10 is adapted to steer a vehicle to the left or the right as the steering shaft 16 rotates about its axis. A wheel stay 18 constituting a part of the steering body 12 is secured to the other end of the steering shaft 16. The wheel stay 18 has a base 19 and a plurality of spokes 20 extending radially outwardly from the base 19. A circular steering operation portion 22, which together with the wheel stay 18 constitutes the steering body 12, is fixed to the distal ends of the of the spokes 20. Hence, a plurality of holes 24 formed by the steering operation portion 22, the spokes 20, and the wheel stay 18 are provided in the steering body 12. These holes 24 are provided to improve the visibility of various meters arranged on an unillustrated instrument panel of the vehicle.

As shown in FIG. 2, the spokes 20 are inclined with respect to the axial direction of the steering shaft 16 in such a manner as to form a space having the configuration of a truncated cone whose base is located on the driver's seat side. The fixed pad 14 is disposed in this space and is secured to a mounting mechanism portion (not shown) which does not rotate and is provided in the base 19. Such a mounting mechanism portion is known and, by itself, the specifics thereof form no part of this invention. As a result, when the steering operation portion 22 is operated, the fixed pad 14 is held in a stationary state, so that the steering body 12 and the fixed pad 14 are rotated relative to each other.

The external dimensions of the fixed pad 14 are set in such a manner that an outer peripheral edge of the fixed pad 14 does not project over the holes 24 and does not interfere with the same. In addition, the peripheral surface of the fixed pad 14 facing the wheel stay 18 is inclined along the inclined surface of the wheel stay 18 so that a uniform clearance is constantly provided therebetween regardless of whether or not the steering operation portion 22 is operated. In other words, as shown in FIG. 2, an angle of inclination $\theta$ with respect to the axis of the steering shaft 16 is set to be identical for both the wheel stay 18 and the fixed pad 14.

Switches 26 for actuating motors are provided on the fixed pad 14. The position of the switches 26 does not change even when the steering operation portion 22 is operated, and the surface of the fixed pad 14 has the function of a so-called operation panel. In addition, an air bag mechanism (not shown) is accommodated in the fixed pad 14. This air bag mechanism is so arranged that when the vehicle is decelerated suddenly, a bag is inflated instantaneously by detecting the deceleration, and the bag thus inflated is interposed between the steering body 12 and the occupant being seated in the seat, thereby protecting the occupant.

The operation of the first embodiment will be described hereinunder.

As the steering operation portion 22 is rotatively operated, the torque is transmitted to the steering shaft 16 via the spokes 20 and the base 19 of the wheel stay 18. Consequently, the steering shaft is rotated to allow the steering gear to perform steering to the left or the right.

When the steering operation portion 22 is operated, since the fixed pad 14 is held in the stationary state, the position of the operation switches 26 on the fixed pad 14 does not change, with the result that the operating efficiency is good.

In addition, since the spokes 20 are inclined in such a manner as to form a truncated cone-shaped space inwardly of the steering operation portion 22, the fixed pad 14 can be made large enough to allow the bag of the air bag mechanism to be accommodated easily therein.

As described above, the external dimensions of the fixed pad 14 are set in such a manner as not to interfere with the holes 24, and the peripheral surface of the fixed pad 14 facing the wheel stay 18 is inclined so that a uniform clearance is constantly provided therebetween regardless of whether or not the steering operation portion 22 is operated. Accordingly, there is no substantial room for a foreign object to enter the gap formed between the peripheral surface of the fixed pad 14 and the wheel stay 18.

Figure 3:
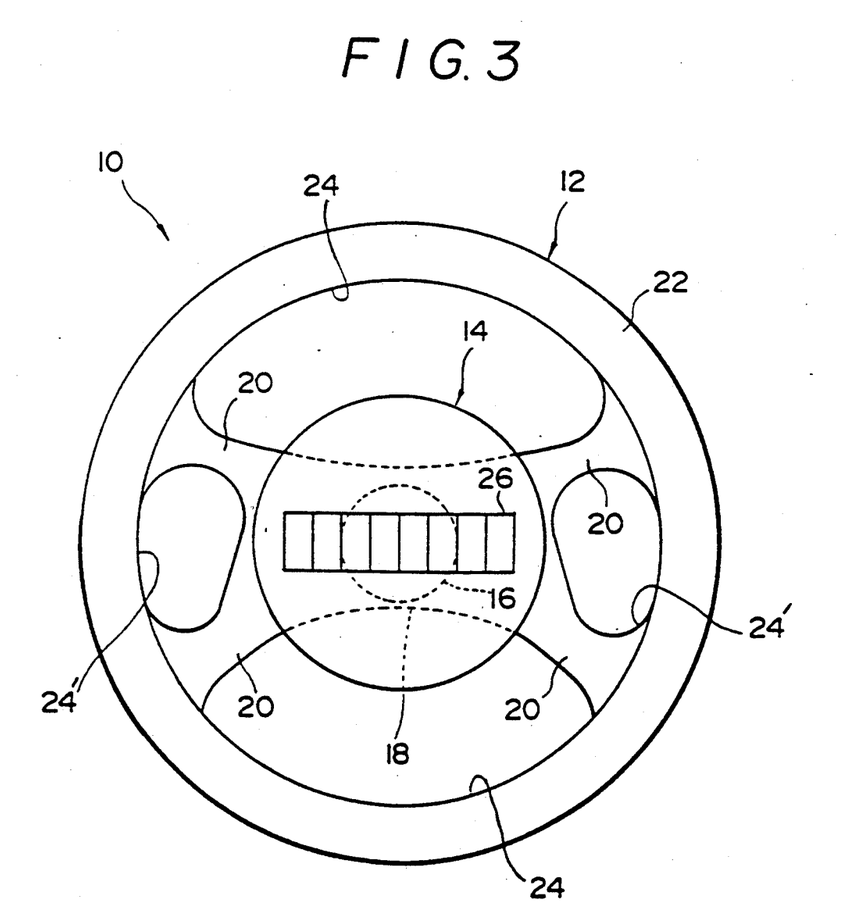
FIG. 3 is a front elevational view of a steering apparatus in accordance with a second embodiment of the invention.

Referring now to FIG. 3, a description will be given of a second embodiment of the present invention. In the drawing, components that are identical with those of the first embodiment will be denoted by the same reference numerals and a description thereof will be omitted.

In the second embodiment, the holes 24 formed above and below spokes 20 by the steering operation portion 22, the spokes 20, and the wheel stay 18 are formed to be large so as to improve the visibility of meters provided on the instrument panel of the vehicle with smaller holes 24' being formed at the ends of the spoke 20. In this case, the peripheral surface of the fixed pad 14 facing the wheel stay 18 interferes with the holes 24. Such a case also occurs when the external dimensions of the fixed pad are enlarged.

As shown in FIG. 3, an arrangement is provided such that an angle formed by an outer peripheral edge of the spoke 20 and an outer peripheral edge of the fixed pad 14 becomes an obtuse angle. Since the outer configuration of the fixed pad 14 is circular, this angle does not change when a steering operation is carried out, so that a constant angle (obtuse angle) is constantly formed.

A description will now be given of the operation of this second embodiment. In a case where a foreign object abuts the corner formed by the spoke 20 and the fixed pad 14 during a steering operation, since that corner is formed into an obtuse angle, the foreign object is pressed by the two sides of this corner, and there occurs a force acting in such a manner as to press the foreign object by the sides of this angular portion and drive away the same in the radial direction of the fixed pad 14. Accordingly, it is possible to prevent a foreign object from being caught between the fixed pad 14 and the wheel stay 18.

Figure 4:
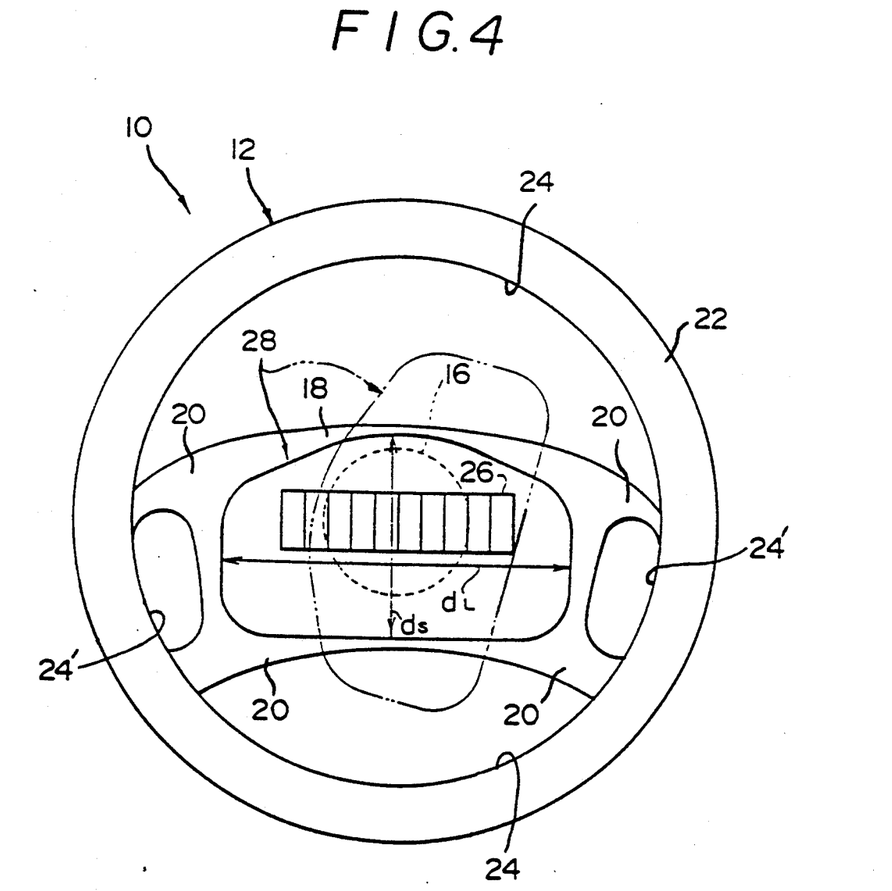
FIG. 4 is a front elevational view of a steering apparatus in accordance with a third embodiment of the invention.

Referring now to FIG. 4, a description will be given of a third embodiment of the present invention. In the same way as the above-described second embodiment, components that are identical with those of the first embodiment are denoted by the same reference numerals, and a description thereof will be omitted.

A fixed pad 28 in the third embodiment is formed into a substantially elliptical configuration i.e., as is apparent from FIG. 4, the pad 28 has a configuration that has been distorted from a true ellipse shape to one that is somewhat oblong; and During a steering operation, the two side portions of the fixed pad 28 having outer peripheral edges between which a short diameter $d_s$ of the fixed pad 28 is formed do not interfere with the holes 24, but the other two side portions thereof having outer peripheral edges between which a long diameter $d_L$ is formed interfere with the holes 24 (the dot-dash line illustration of pad 28 in FIG. 4 represents such a situation where turning of the steering body 12 causes pad 28 to extend beyond spoke 20 so as to partially overlap opening 24). Accordingly, an angle formed by the outer peripheral edge of the fixed pad 28 and that of the spoke 20 changes depending on the angle of operation of the steering operation portion 22. In this third embodiment, the configuration of the spokes 20 is determined in such a manner that a minimum angle of this changing angle becomes an obtuse angle. In other words, the arrangement is such that an angle formed by the spoke 20 and a portion of the radius of least curvature of the outer peripheral edge of the fixed pad 28 becomes an obtuse angle. As a result, all the angles formed by the spoke 20 and the other outer peripheral edges of the fixed pad 28 can be formed into obtuse angles.

A description will now be given of the operation of this third embodiment.

Figure 5:
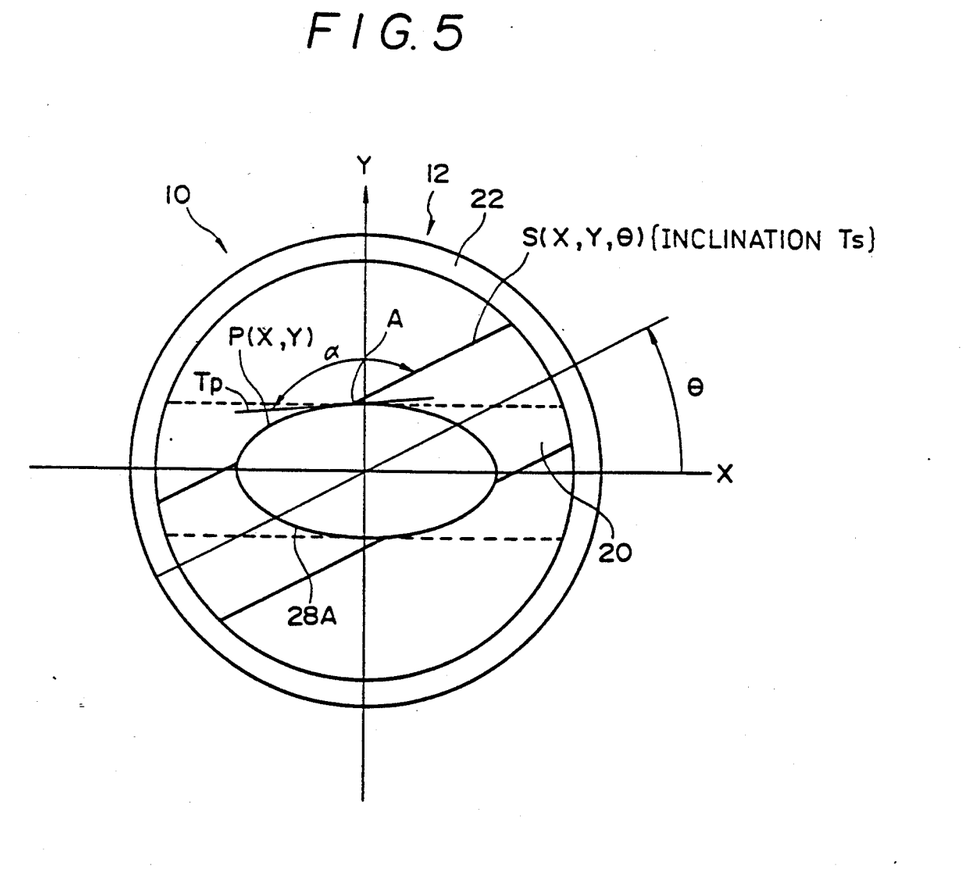
FIG. 5 is a front elevational view of the steering apparatus for obtaining the conditions of the configurations of a fixed pad and spokes.

First referring to FIG. 5 which is a simplified diagram of FIG. 4 (in which, for the purpose of simplifying the following explanation, the periphery of fixed pad 28 is treated as if it approximates an elliptical shape as is shown in FIG. 5 when, as shown in FIG. 4, such is not truly the case) a description will be given of a procedure for setting the configurations in such a manner that the angle formed by the spoke 20 and the portion of the radius at least curvature of the outer peripheral edge of the fixed pad 28 becomes an obtuse angle.

As shown in FIG. 5, rectangular coordinates X and Y with the center of rotation of the steering shaft set as an origin are assumed. A formula representing an outer peripheral edge of a fixed pad 28A at this time is assumed to be $P(X, Y) = 0$. However, although the functional form $P(X, Y)$ cannot be determined uniquely, the configuration of the pad $P(X, Y) = 0$ is selected in such a manner as to satisfy the formula $P(X, Y) > 0$ on its inner side (i.e, on the pad). Here, P is selected such that $P(0, 0) > 0$, for example.

Meanwhile, a formula representing an external configuration line of the spoke 20 is assumed to be $S(X, Y, \theta) = 0$. Here, since $\theta$ is an angle of rotation taken from a reference position located between the fixed pad 28A and the spoke 20, this functional form $S(X, Y, \theta)$ is also selected to satisfy the formulas $S(X, Y, \theta)$ on the inner side of the spoke (i.e., on the spoke). In this case as well, S is selected such that $S(0, 0, \theta) > 0$.

Here, a case is considered in which the outer peripheral edge $P(X, Y) = 0$ of the fixed pad 28A and the external configuration line $S(X, Y, \theta)$ of the spoke 20 intersects each other. Point A shown in FIG. 5 is a point of intersection, and its coordinates are assumed to be $(X0, Y0)$. At this juncture, a condition enabling an angle $\alpha$ formed by a tangent TP of the fixed pad 28A at point A and a tangent (an inclination in the case of a straight line) TS of the spoke 20 to become an obtuse angle can be given by the following formula on the basic principle referred to in the summary of the invention:

$$P_X(X_0, Y_0) \times S_X(X_0, Y_0, \theta) + P_Y(X_0, Y_0) \times S_Y(X_0, Y_0, \theta) > 0 \quad (1)$$

$$P_X(X, Y) = \frac{\partial P(X, Y)}{\partial X} \quad (2)$$

Where, $$P_Y(X, Y) = \frac{\partial P(X, Y)}{\partial Y} \quad (3)$$

$$S_X(X, Y, \theta) = \frac{\partial S(X, Y, \theta)}{\partial X} \quad (4)$$

$$S_Y(X, Y, \theta) = \frac{\partial S(X, Y, \theta)}{\partial Y} \quad (5)$$

$P_X(X_0, Y_0)$, $S_X(X_0, Y_0, \theta)$, $P_Y(X_0, Y_0)$, $S_Y(X_0, Y_0, \theta)$ $P_x(X_0, Y_0)$, $S_x(X_0, Y_0, \theta)$, $P_y(X_0, Y_0, \theta)$ respectively assume the values of $X = X_0$, $Y = Y_0$.

If the outer peripheral edge $P(X, Y) = 0$ of the fixed pad 28A and the outer configuration $S(X, Y, \theta) = 0$ of the spoke 20 are determined in such a manner that the aforementioned relations are met with respect to all the points in cases where there are a plurality of points A and with respect to all the values of the angle $\theta$, the angle formed by the outer peripheral edge of the fixed pad 28A and the spoke 20 can be set to an obtuse angle in all cases.

In cases where a foreign object abuts the corner formed by the spoke 20 and the fixed pad 28A during a steering operation, since the corner is formed into an obtuse angle, there occurs a force acting in such a manner as to press the foreign object by the sides of this angular portion and drive away the same in the radial direction of the fixed pad 28A. Accordingly, it is possible to prevent a foreign object from being caught between the fixed pad 28A and the wheel stay 18.

Figure 6:
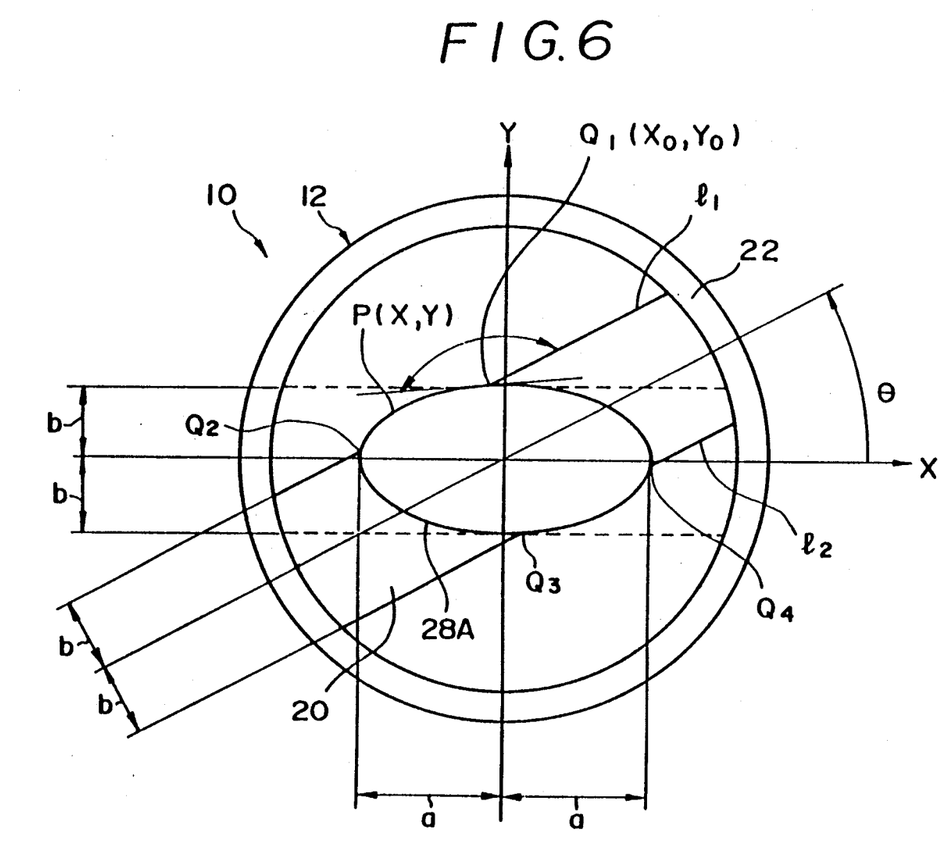
FIG. 6 is a front elevational view illustrating a specific example of the third embodiment.

Using the aforementioned formulae, a condition will be determined for restricting the elliptical configuration of the fixed pad 28A in a specific example in which the configuration of the fixed pad 28A is made elliptical and the spokes are formed rectilinearly.

As shown in FIG. 6, the configuration $P(X, Y) = 0$ of the fixed pad 28A can be expressed as the following formula:

$$P(X, Y) = 1 - \frac{X^2}{a^2} - \frac{Y^2}{b^2} = 0 \quad (6)$$

Meanwhile, the external configuration $S(X, Y, \theta) = 0$, if divided into an upper side $l_1$ and a lower side $l_2$, can be expressed as follows:

$$S(X, Y, \theta) = b + X\sin\theta - Y\cos\theta = 0 \quad (7) \{l_1\}$$

$$S(X, Y, \theta) = b - X\sin\theta + Y\cos\theta = 0 \quad (8) \{l_2\}$$

There are four points of intersection ($Q_1$, $Q_2$, $Q_3$, $Q_4$) between the fixed pad 28A and the spoke 20 in cases other than when the angle $\theta$ is 0° and 180°. Since the points $Q_1$ and $Q_3$ and the points $Q_2$ and $Q_4$ are at positions of rotation symmetry, it suffices if the angle of intersection between point $Q_1$ and $Q_2$ is determined.

If the aforementioned formulae (2) to (5) are applied on the basis of the formulae (6) to (8), we have $$P_X(X, Y) = -\frac{2X}{a^2} \quad (9)$$

-continued $$P_Y(X, Y) = -\frac{2Y}{b^2} \quad (10)$$

$$S_X(X, Y, \theta) = \sin\theta \quad (11)$$
$$S_Y(X, Y, \theta) = -\cos\theta \quad (12)$$

From the above, in order for an obtuse angle to be formed at point $Q_1$ (coordinates ($X_0$, $Y_0$)), it is necessary to satisfy the following formula:

$$P_X(X_0, Y_0) \times S_X(X_0, Y_0, \theta) + P_Y(X_0, Y_0) \times S_Y(X_0, Y_0, \theta) = \quad (13)$$

$$-\frac{2X\sin\theta}{a^2} + \frac{2Y\cos\theta}{b^2} > 0$$

Meanwhile, if it is assumed that a point of intersection of two lines passing through point $Q_1$ is ($X_0$, $Y_0$), the following formulae can be obtained from formulae (6) and (7):

$$1 - \frac{X_0^2}{a^2} - \frac{Y_0^2}{b^2} = 0 \quad (14)$$

$$b + X_0\sin\theta - Y_0\cos\theta = 0 \quad (15)$$

From the aforementioned formulae (13), (14) and (15, we have $$\frac{b}{a} > \frac{1}{2} \quad (16)$$

If the condition of this formula (16) is met, it is always possible to maintain the angle of intersection at an obtuse angle irrespective of the angle $\theta$ of rotation of the steering operation portion.

It should be noted that although in this specific example the fixed pad 28A is formed into an elliptical configuration and the spokes are formed into a rectilinear configuration, a condition for any configuration can be set insofar as a formula expressing the external configuration can be met.

As described above, the steering apparatus with a fixed pad in accordance with the present invention offers an outstanding advantage in that the apparatus allows a steering operation to be effected smoothly by effectively preventing a foreign object from being caught therein without restricting the configuration of the fixed pad.

What is claimed is:

1. In a steering apparatus of the type in which a steering shaft is rotatable about a rotational axis for transmitting a steering force, in which a spoke is secured to one end of the steering shaft and extends outwardly therefrom in a manner such that portions thereof which are spaced from said steering shaft are forwardly inclined relative to said rotational axis so as to form a tapered space, in which a steering operation portion for rotation of the steering shaft is secured to a distal end of said spoke so as to be located forwardly of said one end of the steering shaft, and in which a fixed pad is accommodated in the tapered space formed by said spoke and is mounted in a manner enabling the steering operation portion and said spoke to be displaceable relative to the fixed pad when said steering operation portion is rotated; the improvement wherein:

the fixed pad and spoke are configured and positioned relative to each other in a manner which causes a peripheral edge of the fixed pad to appear to intersect with a laterally outer side edge of the spoke in at least certain relative positions as viewed in a direction along said rotational axis, and all angles between the peripheral edge of the fixed pad and the laterally outer side edge of said spoke in said certain relative positions are obtuse as viewed in said direction along said rotational axis regardless of the position of said steering operation portion relative to the fixed pad and said obtuse angles satisfying either of the following:

$M_2 - m_1 < 0$ and $1 + m_1 \times m_2 > 0$ $M_2 - m_1 > 0$ and $1 + m_1 \times m_2 < 0$ wherein $m_1$ is a variable in the equation $y = m_1 x + n_1$ expressing a normal line of said outer peripheral edge of said fixed pad, $n_1$ being a constant, $m_2$ is a variable in the equation $y = m_2 x + n_2$ expressing a normal line of said laterally outer side edge of said spoke, $n_2$ being a constant, and x and y are position coordinates.

2. A steering apparatus for a vehicle according to claim 1, wherein the configuration of said fixed pad as viewed in the direction of the rotational axis of the steering shaft is circular, and said fixed pad and a hole formed by said laterally outer side edge of said spoke and said steering operation portion are arranged to partially overlap each other as viewed in the direction of the rotational axis of the steering shaft.

3. A steering apparatus for a vehicle according to claim 2, wherein said spoke is arcuately shaped.

4. A steering apparatus for a vehicle according to claim 1, wherein the configuration of said fixed pad as viewed in the direction of the rotational axis of the steering shaft is substantially elliptical, and said fixed pad and a hold formed by said laterally outer side edge of the spoke and said steering operation portion are arranged to partially overlap with each other as viewed in the direction of the rotational axis of the steering shaft during rotation of said steering operation position.

5. A steering apparatus for a vehicle according to claim 4, wherein said spoke is arcuately shaped.

6. A steering apparatus for a vehicle according to claim 1, wherein said spoke is arcuately shaped.

* * * * *